United States Patent Office 2,889,358
Patented June 2, 1959

2,889,358

CHLORINATED ESTERS OF 1,1-DIOLS AND PROCESS FOR THEIR PRODUCTION

Howard R. Guest, Charleston, and Harry A. Stansbury, Jr., South Charleston, W. Va., assignors to Union Carbide Corporation, a corporation of New York No Drawing. Application December 3, 1956
Serial No. 625,609

9 Claims. (Cl. 260—487)

This invention relates to certain chlorinated esters of 1,1-diols and to a process for their production. More particularly, the present invention relates to chlorinated diesters containing at least 3 chlorine atoms per molecule.

The novel compounds of the present invention may be represented by the general formula:

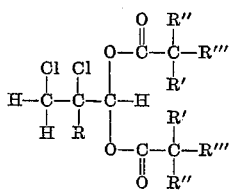

wherein R, R' and R" are members selected from the class consisting of hydrogen and chlorine and R''' is a member selected from the class consisting of hydrogen, chlorine, lower alkyl and chlorinated lower alkyl, at least one of said R, R', R" and R''' being chlorine.

Illustrative of the novel compounds of the present invention are 2,3-dichloropropylidene bis(chloroacetate), 2,3 - dichloropropylidene bis(dichloroacetate), 2,3 - dichloropropylidene bis(trichloroacetate), 2,2,3-trichloropropylidene bis(chloroacetate), 2,2,3-trichloropropylidene bis(chloroacetate), 2,2,3-trichloropropylidene bis(dichloroacetate), 2,2,3-trichloropropylidene bis(trichloroacetate), 2,3-dichloropropylidene bis(2-chloropropionate), 2,3-dichloropropylidene bis(2,2-dichloropropionate), 2,3-dichloropropylidene bis(2-chlorobutyrate), 2,3-dichloropropylidene bis(2,2-dichlorobutyrate), 2,3-dichloropropylidene bis(2,3-dichlorobutyrate), 2,2,3-trichloropropylidene bis(2-chloropropionate), 2,2,3-trichloropropylidene bis(2,2 - dichloropropionate), 2,2,3 - trichloropropylidene bis(2-chlorobutyrate), 2,2,3-trichloropropylidene bis(2,2-dichlorobutyrate), 2,2,3-trichloropropylidene bis(2,3-dichlorobutyrate), 2,2,3 - trichloropropylidene diacetate, 2,2,3-trichloropropylidene dipropionate, 2,2,3-trichloropropylidene dibutyrate, 2,2,3-trichloropropylidene dipentanoate, and 2,2,3-trichloropropylidene dihexanoate.

The 2,2,3-trichloropropylidene diesters of the present invention can be prepared by reacting 2,2,3-trichloropropionaldehyde with an anhydride having the formula:

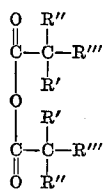

wherein R', R" and R''' have the values given supra. The reaction may be conducted at a temperature of from about 10° C. to about 120° C. but is preferably conducted at a temperature of from about 50° C. to about 90° C. The reaction is conducted in the presence of from about 0.2 percent to about 2 percent by weight in the reaction mixture of an acid catalyst, such as sulfuric acid, toluene sulfonic acid, hydrochloric acid and the like. After a reaction period of from 0.2 to 20 hours, the acid catalyst is neutralized with anhydrous sodium acetate, calcium acetate, sodium carbonate or a similar material. The desired 2,2,3-trichloropropylidene diester may be isolated as a stripped residue product. If the ester is thermally stable, it can be refined by distillation. Crystalline esters may also be purified by crystallization.

The 2,3-dichloropropylidene diesters of the present invention can be prepared in the same manner as the 2,2,3-trichloropropylidene diesters, using 2,3-dichloropropionaldehyde, instead of 2,2,3-trichloropropionaldehyde as the starting material. They may also be prepared by reacting acrolein with an anhydride having the formula:

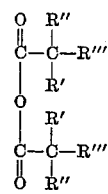

wherein R', R" and R''' have the values given supra, under the same conditions as are given above, recovering the resulting diester, as above, and thereafter reacting the resulting diester with at least an equimolecular amount of chlorine, which can be fed over a period of from about 1 to 8 hours. The chlorination may be conducted at a temperature of from about −20° C. to about 50° C. but is preferably conducted at a temperature of from about 0° C. to about 20° C. It is preferably conducted in a reaction medium such as carbon tetrachloride, ethylene dichloride, chloroform, propylene dichloride or benzene, with constant agitation. After the reaction is complete (from 10 to 60 minutes after all the chlorine has been fed), the reaction mixture can be stripped at about 80° C. to 160° C. and 1 to 50 mm. Hg to leave the desired 2,3-diol diester as residue product.

The following examples are illustrative:

EXAMPLE I

2,2,3-trichloropropylidene diacetate

A solution of 1.84 grams of sulfuric acid (.0375 equivalents) in 102 grams of acetic anhydride (1 mole) was stirred at 50° C. while 81 grams of 2,2,3-trichloropropionaldehyde (0.5 mole) were fed over a period of 15 minutes. After a reaction period of 0.5 hour at 50° C., 3.3 grams of anhydrous sodium acetate (.04 equivalent) were added to neutralize the catalyst. The mixture was fractionated under reduced pressure to obtain 2,2,3-trichloro-1,1-propanediol diacetate (also named 2,2,3-trichloropropylidene diacetate) as a colorless liquid having these properties: boiling range 104° C.–110° C./1 mm. Hg, n 30/D 1.4624, specific gravity 20/20° C. 1.3940, 39.0 percent Cl (theory 40.4 percent Cl), melting point 47° C.–49° C. (super-cools very readily). The yield and efficiency were 62 percent and 80 percent, respectively, based on 2,2,3-trichloropropionaldehyde.

EXAMPLE II

2,3-dichloropropylidene bis(chloroacetate)

A mixture of 171 grams of chloroacetic acid anhydride (1 mole), 2 milliliters of 96 percent sulfuric acid catalyst (.075 equivalent) and 84 grams of dry acrolein (1.5 moles) was stirred at 70° C. for 8.5 hours. After addition of 8.2 grams of anhydrous sodium acetate (.10 equivalent) the mixture was stripped to a kettle temperature of 60° C./5 mm. Hg to obtain 2-propene-1,1-diol bis-(chloroacetate) as a residue product having these properties: n 30/D 1.440, specific gravity 20/20° C. 1.472, 29.9 percent Cl (theory 31.3 percent Cl). The yield was 92 percent based on chloroacetic acid anhydride.

A solution of 91 grams of 2-propene-1,1-diol bis(chloroacetate) (0.4 mole) in 75 grams of benzene was chlorinated at 10° C. until 31 grams (.44 mole) of chlorine had been absorbed. The solution was stripped to a kettle temperature of 60° C./8 mm. Hg to obtain 2,3-dichloro-1,1-propanediol bis(chloroacetate) as a viscous residue product having these properties: $n$ 30/D 1.4820, specific gravity 35/20° C. 1.445, 36.3 percent Cl (theory 47.6 percent Cl). The low chlorine content resulted from hydrogen chloride being evolved during the stripping operation. The yield was 81 percent based on 2-propene-1,1-diol bis(chloroacetate).

EXAMPLE III

2,3-dichloropropylidene bis(trichloroacetate)

Trichloroacetic acid anhydride (.6 mole, 186 grams) was stirred at 55° C.–60° C. while 67 grams of dry acrolein (1.2 moles) were fed over a period of 25 minutes. After a reaction period of an hour at 60° C., the solution was stripped to a kettle temperature of 78° C./15 mm. Hg to obtain 2-propene-1,1-diol bis(trichloroacetate) as a residue product having these properties: $n$ 30/D 1.4850, specific gravity 20/20° C. 1.596, 55.2 percent Cl (theory 58.4 percent Cl). The yield was 97 percent based on trichloroacetic acid anhydride.

A solution of 87 grams of 2-propene-1,1-diol bis(trichloroacetate) (0.238 mole) in 150 grams of carbon tetrachloride was chlorinated at 20° C. until 21 grams (.3 mole) were absorbed. The solution was stripped to a kettle temperature of 40° C./10 mm. Hg to obtain 2,3-dichloro-1,1-propanediol bis(trichloroacetate) as a residue product having these properties: $n$ 30/D 1.4928, specific gravity 20/20° C. 1.641, 58.5 percent Cl (theory 65.1 percent). The yield was 91 percent based on 2-propene-1,1-diol bis(trichloroacetate).

EXAMPLE IV

2,3-dichloropropylidene bis(2,3-dichlorobutyrate)

A solution of 105 grams of allylidene dicrotonate (.5 mole) in 400 grams of carbon tetrachloride was chlorinated at 9° C.–18° C., until 105 grams (1.5 moles) were absorbed. The mixture was stripped to a kettle temperature of 80° C./10 mm. Hg to obtain the product as a viscous residue having these properties: Specific gravity 20/20° C. 1.412, $n$ 30/D 1.4940, 46.3 percent Cl (theory 50.3 percent), molecular weight by the Menzies-Wright method 580 (theory 423). The yield was 91 percent.

EXAMPLE V

2,2,3-trichloropropylidene bis(chloroacetate)

A mixture of 86 grams of chloroacetic acid anhydride (.5 mole) and 1.84 grams of concentrated sulfuric acid catalyst (.0375 equivalent) was stirred at 80° C. while 162 grams of 2,2,3-trichloropropionaldehyde (1 mole) were fed over a period of 15 minutes. After a reaction period of two hours at 80° C., the solution was treated with 3.3 grams of anhydrous sodium acetate (.04 equivalent) to neutralize the catalyst. The mixture was stripped to a kettle temperature of 90° C. at 4 mm. Hg to obtain 2,2,3-trichloropropylidene bis(chloroacetate) as a residue product having these properties: $n$ 30/D 1.4769, specific gravity 26°/20° C. 1.652, 26.7 percent C (theory 25.3 percent), 2.6 percent H (theory 2.1 percent), 43.3 percent Cl (theory 53.4 percent). The yield was 66 percent based on the anhydride charged.

EXAMPLE VI

2,2,3-trichloropropylidene bis(trichloroacetate)

A mixture of 155 grams of trichloroacetic acid anhydride (.5 mole) and 1.84 grams of concentrated sulfuric acid catalyst (.0375 equivalent) was stirred at 85° C. while 162 grams of 2,2,3-trichloropropionaldehyde (1 mole) were fed over a period of 10 minutes. After a reaction period of 2.5 hours at 85° C., the solution was treated with 3.3 grams of anhydrous sodium acetate (.04 equivalent) to neutralize the catalyst. The mixture was stripped to a kettle temperature of 90° C. at 1 mm. Hg to obtain 2,2,3-trichloropropylidene bis(trichloroacetate) as a residue product having these properties: 18.8 percent C (theory 17.8 percent), 1.5 percent H (theory 0.7 percent), 56.8 percent Cl (theory 67.9 percent). The yield was 35 percent based on the anhydride charged.

The compounds of this invention are useful as plasticizers for vinyl resins and as solvents for a wide variety of compounds. They are also useful as herbicides. Their herbicidal activity is demonstrated by a series of tests which were conducted in the following manner. In each test 25 radish seeds (variety Burpee's Red Globe) were placed on a piece of filter paper in a Petri dish. Then 10 milliliters of a 0.1 percent (by weight) aqueous solution of the chemical being tested, either in emulsion or in suspension, were placed in the Petri dish. After five days the seeds were observed for germination. The results of these experiments are summarized in Table I below. The results are given as the percentage of radish seeds germinating. In comparison with these results, untreated radish seeds, used as a control, showed 100 percent germination.

TABLE I

| Compound | Percent germination |
| --- | --- |
| 2,3-dichloropropylidene bis (2,3-dichlorobutyrate) | 83 |
| 2,2,3-trichloropropylidene diacetate | 12 |
| 2,2,3-trichloropropylidene bis(chloroacetate) | 0 |
| 2,2,3-trichloropropylidene bis(trichloroacetate) | 32 |

For three compounds, the above test was repeated, using Italian rye grass seeds in place of radish seeds. The results of these experiments, given as the percentage of rye grass seeds germinating, are presented in Table II. Untreated rye grass seeds, used as a control, showed 100 percent germination, by comparison.

TABLE II

| Compound | Percent germination |
| --- | --- |
| 2,2,3-trichloropropylidene diacetate | 8 |
| 2,2,3-trichloropropylidene bis(chloroacetate) | 0 |
| 2,2,3-trichloropropylidene bis(trichloroacetate) | 0 |

We claim:
1. A chlorinated diester having the general formula:

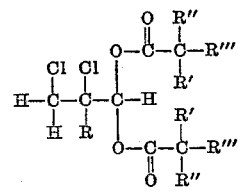

wherein R, R' and R" are members selected from the class consisting of hydrogen and chlorine and R''' is a member selected from the class consisting of hydrogen, chlorine, lower alkyl, and chlorinated lower alkyl, at least one of said R, R', R" and R''' being chlorine.

2. A chlorinated diester having the general formula:

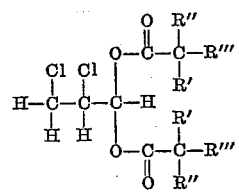

wherein R' and R" are members selected from the class consisting of hydrogen and chlorine and R''' is a member selected from the class consisting of hydrogen, chlorine, a lower alkyl group at least one of said R', R" and R''' being chlorine and a chlorinated lower alkyl group.

3. A chlorinated diester having the general formula:

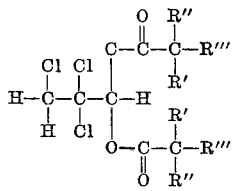

wherein R' and R" are members selected from the class consisting of hydrogen and chlorine and R''' is a member selected from the class consisting of hydrogen, chlorine, a lower alkyl group and a chlorinated lower alkyl group.

4. 2,3-dichloropropylidene bis(chloroacetate).
5. 2,3-dichloropropylidene bis(trichloroacetate).
6. 2,3-dichloropropylidene bis(2,3-dichlorobutyrate).
7. 2,2,3-trichloropropylidene bis(chloroacetate).
8. 2,2,3-trichloropropylidene bis(trichloroacetate).
9. 2,2,3-trichloropropylidene diacetate.

References Cited in the file of this patent
UNITED STATES PATENTS 2,691,672     Brust ------------------ Oct. 12, 1954
2,734,075     Brust et al. -------------- Feb. 7, 1956

OTHER REFERENCES

Arndt et al.: Ber. Deut. Chem. 61 (1928) p. 1122.
Kirrmann et al.: Bull. Soc. Chim. France (1935) Memoires p. 2143–52.